United States Patent [19]

Sunouchi et al.

[11] 4,146,189
[45] Mar. 27, 1979

[54] WINDING UP DEVICE FOR CAMERA

[75] Inventors: Akio Sunouchi, Tokyo; Yoshiaki Watanabe, Fujisawa, both of Japan

[73] Assignee: Canon Kabushiki Kaisha, Tokyo, Japan

[21] Appl. No.: 827,835

[22] Filed: Aug. 25, 1977

[30] Foreign Application Priority Data

Sep. 7, 1976 [JP] Japan .................. 51/106884

[51] Int. Cl.² .............................................. G03B 1/06
[52] U.S. Cl. .............................................. 242/71.4
[58] Field of Search .................. 242/71.4, 71.5, 71; 354/212–214

[56] References Cited

U.S. PATENT DOCUMENTS

| | | | |
|---|---|---|---|
| 3,021,773 | 2/1962 | Hintze et al. | 242/71.4 X |
| 3,645,182 | 2/1972 | Kimura | 242/71.4 |
| 3,948,456 | 4/1976 | Shimizu | 242/71.4 |

Primary Examiner—Leonard D. Christian
Attorney, Agent, or Firm—Toren, McGeady and Stanger

[57] ABSTRACT

The present invention relates to a winding up device for a camera, in which a motor driven winding up shaft, a manual winding up member rotating the winding up shaft by means of manual operation and a one-way clutch means between the winding up shaft and the manual winding up member are provided, so designed that a manual winding up angle conversion means for making the ratio of the rotation angle of the manual winding up member to that of the winding up shaft at a certain determined value is provided between the manual winding up member and the one-way clutch means in such a manner that the rotation angle of the manual winding up is optionally variable by means of the manual winding up angle conversion means while the winding up angle at the time of motor drive is invariable.

3 Claims, 2 Drawing Figures

WINDING UP DEVICE FOR CAMERA

BACKGROUND OF THE INVENTION

So far many winding up devices for a camera enabling both the winding up by means of a motor drive device and the winding up by means of a manual operation have been proposed.

However, in the conventional devices the winding up shaft to be rotated by means of the manual winding up member and the motor driven shaft are connected with each other by means of a one-way clutch means, whereby the winding up rotation angle by the winding up operation of the manual winding up member is equal to that of the coupling member on the winding up shaft to which the driving force is transmitted from the motor drive device.

Consequently, in case the winding up rotation angle of the manual winding up member is varied in order to improve the winding up operability (for example the winding up rotation angle is made smaller), the film is wound up frame by frame with the winding up rotation angle after the angle has been varied.

Thus it is impossible to wind up the film at a standard frame distance, when the film winding up is carried out by means of the conventional motor drive device after the winding up rotation angle of the manual winding up member has been varied.

SUMMARY OF THE INVENTION

A purpose of the present invention is to offer a winding up device capable of not only the manual winding up operation but also the motor driven winding up operation, to designed so that even when the winding up rotation angle of the manual winding up member has been varied, the winding up rotation angle of the motor drive device remains unchanged so as to carry out a normal film winding up.

Another purpose of the present invention is to offer a winding up device designed so that the winding up rotation angle of the manual winding up member can be changed into any optional angle suited for the winding up operation while the winding up rotation angle of the motor drive device remains unchanged.

Figure 1:
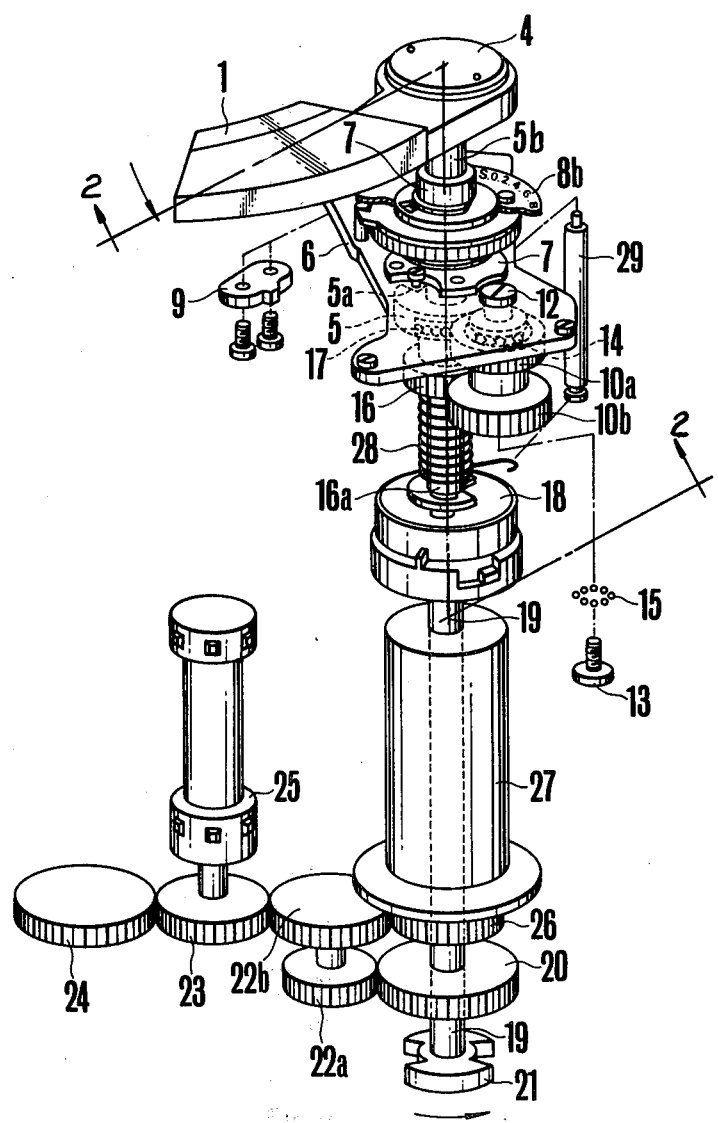
FIG. 1 shows an embodiment of the winding up device in accordance with the present invention in perspective view.
Figure 2:
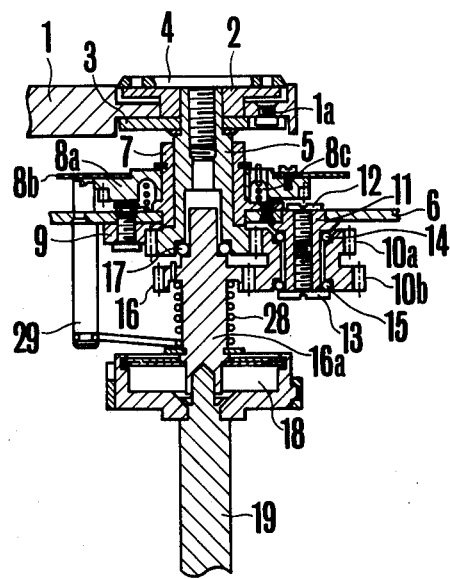
FIG. 2 shows the important parts in FIG. 1 in sectional view.

DETAILED DESCRIPTION OF THE PREFERRED EMBODIMENTS:

In FIGS. 1 and 2, 1 is the winding up lever for manual winding up operation, being fixed at the upper end 56 of the first gear 5 by means of a screw 4 through the pressure plate 2, the pin 1a and connecting member 3.

The gear 5 is supported freely by a bearing 7 fixed on the base plate 6 so as to be rotated by the winding up operation of the winding up lever 1. Around the bearing 7, the film counter members 8a and 8b are provided in such a manner that the display plate 8b is rotated by means of the film counter mechanism not shown in the drawing through the rotation of the winding up lever 1 in the counter-clockwise direction namely the winding up operation note the arrow in FIG. 1, whereby the figure is brought into the film number display window, not shown in the drawing, one by one. The film counter member 8a and 8b are engaged with a return spring 8c designed so as to be increased in the urging force with the winding up operation, whereby the film counter means are brought back to the starting position by the opening and closing operation of the back cover not shown in the drawing of the camera.

The first gear 5 presents a notch 5a having no tooth, in which notch a stopper 9 fixed on the base plate 6 is engaged so as to control the position in which the first gear 5 is brought back after the completion of the manual winding up operation. With the teeth of the first gear 5 those of the second gear 10a are engaged.

The second gear is rotatably supported on the pivot 11 fixed on the base plate 6 by means of the screws 12 and 13 and the steel balls 14 and 15, being constituted at the lower end as one body with the third gear 10b. The third gear 10b is engaged with the fourth gear 16.

In the embodiment shown in FIGS. 1 and 2, the number of the teeth of the respective gears is chosen as follows in order to make the winding up angle at the time of the manual winding up operation smaller than that at the time of the motor driven winding up operation.

The number of the teeth of the first gear $(5) >$ the number of the teeth of the second gear $(10a)$.

The number of the teeth of the third gear $(10b) >$ the number of the teeth of the fourth gear $(16)$.

16a is the middle shaft constituted as one body with the fourth gear 16, whose upper part supports the inner diameter part of the first gear 5 through steel balls 17 and whose lower part is connected with a one-way clutch means 18.

19 is a winding up shaft, whose upper end is connected with the middle shaft through the one-way clutch means 18 and whose lower end is provided with a coupling 21 to be connected with the winding up member, not shown in the drawing, of the motor drive device. Further, the fifth gear 20 is fixed on the winding up shaft 19. The fifth gear 20 is engaged with the sixth gear 22a, while the seventh gear 22b making one body with the gear 22a is engaged with the eighth gear 23, which is connected with a sprocket 25 through a conventional clutch mechanism. Further, the seventh gear 22b is engaged with the ninth gear 26 operatively engaged with the film winding up spool 27 by means of a conventional friction mechanism. The eighth gear 23 is further engaged with a tenth gear 24 for shutter charge.

28 is the return spring for the winding up lever 1, which spring is provided around the shaft 16a, being fixed on the fourth gear 16 at the one end and on the spring hanger member 2a fixed on the base plate 6 at the other end.

As explained above, the manual winding up angle conversion means consisting of the first gear 5, the second gear 10a, the third gear 10b and the fourth gear 16 is provided between the winding up lever 1 and the one-way cluch means 18.

The operation of the embodiment constituted as mentioned above in accordance with the present invention will now be explained in detail. During manual winding up, at first the winding up lever 1 is rotated in the direction of the arrow in FIG. 1, when the first gear 5 forming one body with the lever 1 is rotated in the counter-clockwise direction, the second and the third gear 10a and 10b are rotated in the clockwise direction. In consequence, the fourth gear 16 is rotated in the counter-clockwise direction, charging the return spring 28. In consequence, the shaft 16a at the lower part of the fourth gear 16 rotates the winding up shaft 19 through the one-way clutch means 18. Thereby, the fifth gear 20 is rotated in the counter-clockwise direction, the switch gear 22a and the seven gear 22b in the clockwise direction and the eighth gear 23 in the counter-clockwise direction so as to rotate the sprocket 25 through the clutch mechanism, not shown in the drawing. Further, the ninth gear 26 is rotated in the counter-clockwise direction so as to rotate the spool 27 through a friction mechanism not shown in the drawing. Besides, the tenth gear 24 is also rotated so as to charge a shutter mechanism, not shown in the drawing. The manual winding up operation of the camera is carried out as mentioned above.

Hereby, the relation between the numbers of the teeth of the respective gears being:

The number of the teeth of the first gear (5) > the number of the teeth of the second gear (10a); and The number of the teeth of the third gear (10b) > the number of the teeth of the fourth gear (16), the rotation angle of the winding up lever 1 is increased by means of the manual winding up angle conversion means consisting of the gears 5, 10a, 10b and 16 and transmitted to the shaft 16a, namely to the motor driven winding up shaft 19 through the one-way clutch means 18 so as to carry out the manual winding up operation.

After completion of the manual winding up by means of the operation of the winding up lever 1 the hand leaves the winding up lever 1, when by means of the charged return spring 28 the fourth gear 16 is brought back in the clockwise direction in such a manner that the winding up lever 1 is brought back in the direction opposite to the arrow through the third, the second and the first gear 10b, 10a and 5 until the stopper 9 is engaged into the notch 5a in the first gear 5. Hereby the shaft 16a and the winding up shaft 19 are connected with each other by means of the one-way clutch transmitting only the rotation of the winding up lever along a certain determined direction to the winding up shaft so that the winding up shaft 19 and those gears after the shaft 19 are not returned.

Secondly, during motor driven winding up operation, the coupling member 21 fixed at the lower end of the winding up shaft 19 is rotated in the direction of the arrow by means of the motor drive winding up device in such a manner that in the same way as in case of the manual winding up operation the film winding up and the shutter charge are carried out through the gears 20, 22a, 22b, 23, 24 and 26. However, in this case the rotation of the winding up shaft 19 is not transmitted to the shaft 16a thanks to the one-way clutch means 18.

In accordance with the present invention the one-way clutch means 18 for transmitting only the rotation from the winding up lever 1 to the winding up shaft, is provided between the motor driven winding up shaft 19 and the manually operable winding up lever 1 while between the winding up lever 1 and the one-way clutch means 18 the manual winding up angle conversion means for making the ratio of the angle of the motor driven winding up to that of the manual winding up at a certain determined value is provided so that only the manual winding up angle can be changed without changing the motor driven winding up angle. In consequence a motor driven winding up device applicable to the camera in which the manual winding up angle is not changed, can be directly applied to the camera in which the manual winding up angle is changed, whereby the operability of the manual winding up is much improved without giving any trouble to the photographer, which is remarkably profitable. Further, it is clear that the manual operability can be much improved without any trouble by mounting the manual winding up angle conversion means built in the base plate in accordance with the present invention on the camera in which the winding up angle by means of the winding up lever 1 is equal to that of the winding up shaft by means of the motor drive device, which is very profitable.

Further, in the case of the winding up device in accordance with the present invention, between the operation member (winding up lever) for the manual winding up and the one-way clutch means, the manual winding up angle conversion means is provided so that quite different from the conventional device in which the manual winding up angle conversion means is provided between the coupling member for the motor driven winding up device and the winding up shaft, the operability of the manual winding up can be improved without increasing the load on the motor driven winding up, which is remarkably profitable for the operability of the camera.

What is claimed is:

1. A winding up device for film in a camera capable of being manually operated or motor driven, comprising:
    (a) a manual winding up operation member for manually winding up film,
    (b) a one-way clutch means, said means connected with said manual wind up operation member for transmitting the rotation angle of the member only in a certain determined direction,
    (c) an angle conversion means for manual winding up, said means being provided between said manual wind up operation member and said one-way clutch means for converting the rotation angle of the manual winding up operation member in accordance with the conversion ratio of said conversion means and for producing a certain determined rotation angle through said one-way clutch means,
    (d) a film sprocket for feeding the film,
    (e) a winding up shaft, said shaft being connected at one end thereof with the manual winding up operation member through the one-way clutch means for rotation in response to the conversion ratio,
    (f) a gear train in operable engagement with said winding up shaft and said film sprocket for rotation of the winding up shaft to the film sprocket, and
    (g) a coupling member, said member being provided at the other end of the winding up shaft and transmitting motor driven rotation to said gear train and said film sprocket independentally of the manual winding up operation.

2. A winding up device for a camera, comprising,
    (a) a manual winding up operation member by which film is manually wound up,
    (b) a one-way clutch means, said means connected with said manual winding up operation member for transmitting the rotation angle of the member only in a certain determined direction,
    (c) an angle conversion means for manual winding up comprising a first gear connected to said manual winding up operation member for rotating along with the rotation of the manual winding up operation member, second, third and fourth gears in operable engagement with said first gear for converting the rotation angle of the first gear with a predetermined conversion ratio, and a gear shaft connected to said fourth gear for transmitting the rotation after the conversion to said one-way clutch means, (d) a winding up shaft connectible to said manual winding up operation member through the one-way clutch means for rotation in response to said conversion ratio, (e) a film sprocket for feeding the film, and (f) a gear train in operable engagement with said winding up shaft and said film sprocket for transmitting the rotation of the winding up shaft to the film sprocket.

3. A winding up device in accordance with claim 4, including a base plate, a bearing supporting said first gear, said second and third gears of said angle conversion means for manual winding up are interconnected and rotatably supported on said base plate and said bearing for said first gear is fixed to said base plate so that said first gear engages with the second gear while the third gear engages with the fourth gear for converting the rotation angle.

* * * * *